United States Patent
Harada et al.

(10) Patent No.: US 11,183,964 B2
(45) Date of Patent: Nov. 23, 2021

(54) CONTROL DEVICE FOR AN AC ROTATING ELECTRIC MACHINE

(71) Applicant: Mitsubishi Electric Corporation, Tokyo (JP)

(72) Inventors: Shingo Harada, Tokyo (JP); Keiichi Enoki, Tokyo (JP); Tomohisa Shoda, Tokyo (JP); Nozomu Kamioka, Tokyo (JP); Ryosuke Shigematsu, Tokyo (JP); Kazuhiko Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/794,488

(22) Filed: Feb. 19, 2020

(65) Prior Publication Data

US 2020/0321903 A1  Oct. 8, 2020

(30) Foreign Application Priority Data

Apr. 3, 2019  (JP) .............................. JP2019-070963

(51) Int. Cl.
  *G05B 5/00*   (2006.01)
  *H02P 29/60*  (2016.01)
  *H02P 29/40*  (2016.01)

(52) U.S. Cl.
  CPC .............. *H02P 29/60* (2016.02); *H02P 29/40* (2016.02)

(58) Field of Classification Search
  CPC ........... G05B 2219/42281; G05B 2219/49214; H02P 29/60; H02P 29/40; H02P 21/22; H02P 29/66; H02P 8/36
  See application file for complete search history.

(56) References Cited

U.S. PATENT DOCUMENTS 7,031,813 B2 * 4/2006 Sugiyama .............. B62D 5/008
                                                180/446
2009/0161726 A1    6/2009 Miyamoto et al.

FOREIGN PATENT DOCUMENTS

JP    2007-195343 A    8/2007
JP    2009-158540 A    7/2009
              (Continued)

OTHER PUBLICATIONS

Communication dated Mar. 17, 2020 from Japanese Patent Office in JP Application No. 2019-070963.

*Primary Examiner* — Karen Masih
(74) *Attorney, Agent, or Firm* — Sughrue Mion, PLLC; Richard C. Turner

(57) ABSTRACT

Provided is a control device for an AC rotating electric machine, which includes: a temperature detection unit configured to detect a temperature of a protection unit provided in an object to be protected when a current is supplied from a power conversion circuit including a switching element to the AC rotating electric machine and output, as a detected temperature, one of the temperature and a temperature of the object to be protected that is estimated from the temperature; a temperature compensation unit configured to calculate, through use of the detected temperature output from the temperature detection unit, a compensated temperature equal to or higher than the detected temperature; and a torque limiting unit configured to limit, through use of the compensated temperature calculated by the temperature compensation unit, a torque command value input thereto.

7 Claims, 9 Drawing Sheets

(56) References Cited

FOREIGN PATENT DOCUMENTS

JP      2010-111265 A    5/2010
JP      6107936 B2    4/2017

* cited by examiner

CONTROL DEVICE FOR AN AC ROTATING ELECTRIC MACHINE

BACKGROUND OF THE INVENTION

1. Field of the Invention

The present invention relates to a control device for an AC rotating electric machine.

2. Description of the Related Art

In general, an electrically driven vehicle, for example, an electric vehicle or a hybrid vehicle, is mounted with an AC rotating electric machine as a drive source for the electrically driven vehicle. A power conversion device connected to the AC rotating electric machine has a power converting function of converting DC power from a DC power source to AC power. To convert the DC power to the AC power, the power conversion device is provided with a power conversion circuit including a plurality of switching elements, for example, metal-oxide-semiconductor field-effect transistors (MOSFETs).

When each of the switching elements, for example, the MOSFETs reaches a temperature exceeding a predetermined junction temperature Tj, junction breakdown may occur therein to breakdown the switching element. The AC rotating electric machine may also break down by exceeding a given temperature. As a result, when an AC rotating electric machine is driven through use of a power conversion circuit having such switching elements, it is required to inhibit a temperature increase to prevent the switching elements and the AC rotating electric machine from exceeding respective determined temperatures. Accordingly, it has hitherto been practiced to detect a temperature of each of switching elements and correct a torque command value so as to eliminate a deviation between the detected temperature and a set temperature (see, for example, Japanese Patent No. 6107936).

SUMMARY OF THE INVENTION

As an AC rotating electric machine to be driven through use of a power conversion circuit, a permanent magnet synchronous motor is widely used. As a method of controlling the permanent magnet synchronous motor, two control methods, namely, maximum torque control and flux weakening control are known. The maximum torque control allows torque control to be performed so that a maximum torque can be obtained at an early stage of acceleration. The flux weakening control reduces field magnetic fluxes to be able to suppress an increase in inductive voltage.

As an angular speed of the permanent magnet synchronous motor increases, the inductive voltage generated from the permanent magnet synchronous motor also increases. The inductive voltage is applied to both ends of a DC power source connected to the permanent magnet synchronous motor. Accordingly, when the inductive voltage reaches a limit value of a both-end voltage of the DC power source, a control method is changed from the maximum torque control to the flux weakening control. A magnetic field of the permanent magnet synchronous motor cannot directly be weakened, and therefore the flux weakening control causes a negative current to flow in a d-axis armature and causes a d-axis armature reaction, to thereby generate a demagnetization effect.

Through correction of the torque command value, a quantity of a current flowing in the d-axis armature, that is, a quantity of a current flowing in each of the switching elements is changed. However, when the deviation calculated from the detected temperature of the switching element is used to correct the torque command value, there is a high possibility that an excessive current which hampers the temperature of the switching element from being maintained at a level equal to or lower than a set temperature is caused to flow in the switching element. For example, there is a possibility of causing a current to flow even after the switching element reaches the set temperature. This also increases a possibility that the temperature of the switching element increases to be higher than the set temperature to break down the switching element. Note that, an object to be protected from breakdown due to excessive heat is not limited to the switching element.

The present invention has been achieved to solve such problems, and an object of the present invention is to provide a control device for an AC rotating electric machine that can more reliably prevent breakdown of an object to be protected due to excessive heat during driving of the AC rotating electric machine.

A control device for an AC rotating electric machine according to at least one embodiment of the present invention includes: a temperature detection unit configured to detect a temperature of a protection unit provided in an object to be protected when a current is supplied from a power conversion circuit including a switching element to the AC rotating electric machine and output, as a detected temperature, one of the temperature and a temperature of the object to be protected that is estimated from the temperature; a temperature compensation unit configured to calculate, through use of the detected temperature output from the temperature detection unit, a compensated temperature equal to or higher than the detected temperature; and a torque limiting unit configured to limit, through use of the compensated temperature calculated by the temperature compensation unit, a torque command value input thereto.

According to the present invention, it is possible to more reliably prevent the breakdown of the object to be protected due to excessive heat during driving of the AC rotating electric machine.

DESCRIPTION OF THE EMBODIMENTS

Figure 1:
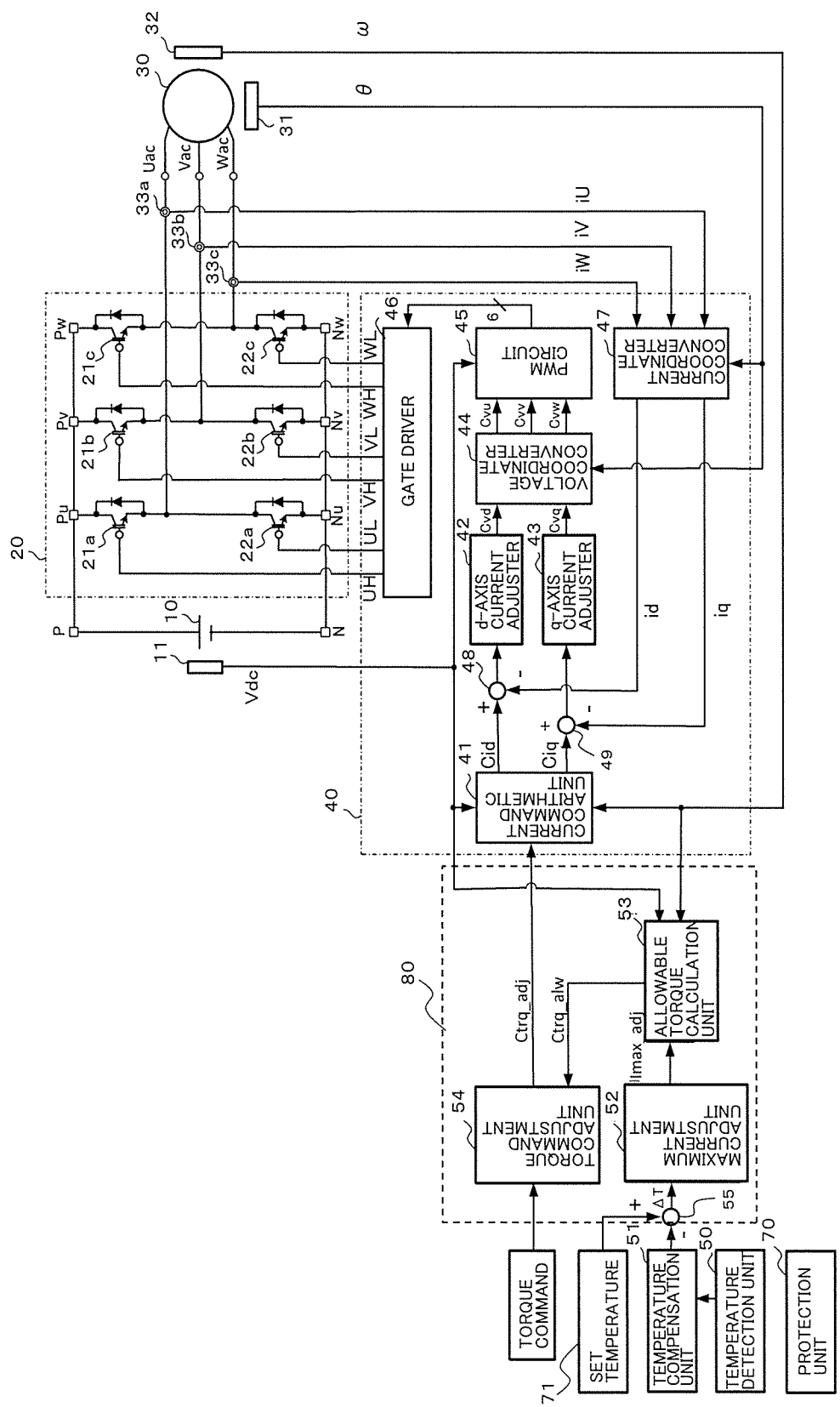
FIG. 1 is a configuration diagram for illustrating a control device for an AC rotating electric machine according to a first embodiment of the present invention.

Referring to the drawings, a control device for an AC rotating electric machine according to at least one embodiment of the present invention is described below. In the individual drawings, the same component, components which can be regarded as the same component, or components corresponding to each other are given the same reference numerals.

First Embodiment

FIG. 1 is a configuration diagram for illustrating a control device for an AC rotating electric machine according to a first embodiment of the present invention. The control device causes an inverter 20 serving as a power conversion circuit to convert a DC voltage applied thereto from a DC power source 10 to an AC voltage and apply the AC voltage resulting from the conversion to an AC rotating electric machine 30 to drive-control the AC rotating electric machine 30. For example, the AC rotating electric machine 30 is a drive source for an electrically driven vehicle.

As illustrated in FIG. 1, the control device includes a voltage detection unit 11, a magnetic pole position detection unit 31, an electric angular speed detection unit 32, current sensors 33a to 33c, an inverter control unit 40, a temperature detection unit 50, a temperature compensation unit 51, a maximum current adjustment unit 52, an allowable torque calculation unit 53, a torque command adjustment unit 54, and a subtractor 55. The maximum current adjustment unit 52, the allowable torque calculation unit 53, the torque command adjustment unit 54, and the subtractor 55 are components of a torque limiting unit 80 configured to limit a torque command value input thereto. The subtractor 55 corresponds to an arithmetic unit in the first embodiment.

For example, the DC power source 10 is a chargeable/dischargeable secondary battery. The DC power source 10 supplies AC power to the AC rotating electric machine 30 via the inverter 20 for direct current (DC)/alternating current (AC) conversion. The DC power source 10 is connected between a higher-voltage node P and a lower-voltage node N. The DC power source 10 and the inverter 20 are connected via the higher-voltage node P and the lower-voltage node N. It may also be possible to provide a boosting converter between the DC power source 10 and the inverter 20 to boost the DC voltage supplied from the DC power source 10 by DC/DC conversion. Accordingly, the DC power source 10 may also be a power conversion circuit configured to perform the DC/DC conversion. It may also be possible to connect a smoothing capacitor configured to smooth a DC voltage between the higher-voltage node P and the lower-voltage node N.

The voltage detection unit 11 detects a DC voltage Vdc from the DC power source 10. Specifically, the voltage detection unit measures a terminal-to-terminal voltage between the higher-voltage node P and the lower-voltage node N and outputs a signal representing the measured terminal-to-terminal voltage. The terminal-to-terminal voltage represented by the signal is herein referred to as the DC voltage value Vdc.

As illustrated in FIG. 1, the inverter 20 is a power conversion circuit including six switching elements 21a to 21c and 22a to 22c. The three switching elements 21a to 21c are connected as upper arms to each other, while the three switching elements 22a to 22c are connected as lower arms to each other. Consequently, the inverter 20 includes three half-bridge circuits in each of which one of the upper arms and one of the lower arms are connected in series. Through ON/OFF driving of the upper-arm switching elements 21a to 21c and the lower-arm switching elements 22a to 22c, the inverter 20 converts the DC voltage from the DC power source 10 to an AC voltage. The obtained AC voltage is applied to the AC rotating electric machine 30.

In the first embodiment, as each of the switching elements 21a to 21c and 22a to 22c, an insulated gate bipolar transistor (IGBT) is used. However, each of the switching elements to be used is not limited to the IGBT. As each of the switching elements, for example, a MOSFET may also be used. When any one or more of the upper-arm switching elements 21a to 21c are referred to, for the sake of convenience, each of the switching elements is hereinafter given "21" as a reference numeral. Likewise, when any one or more of the lower-arm switching elements 22a to 22c are referred to, for the sake of convenience, each of the switching elements is hereinafter given "22" as a reference numeral. When any of the switching elements or all the switching elements are referred to, no reference numeral is given thereto.

Each of the switching elements serving as the IGBT has a semiconductor rectification element connected between a collector electrode and an emitter electrode. For example, the semiconductor rectification element is a diode. The semiconductor rectification element has an anode electrode connected to the emitter electrode and a cathode electrode connected to the collector electrode. Consequently, the semiconductor rectification element is connected in antiparallel to the switching element to have a direction of a current flow opposite to that of the switching element. The switching element used herein means the switching element including the semiconductor rectification element connected in anti-parallel thereto, unless otherwise specified.

The AC voltage resulting from the conversion by the inverter 20 is applied to the AC rotating electric machine 30 to cause the AC rotating electric machine 30 to generate one of a driving force and a braking force for the electrically driven vehicle. For example, the AC rotating electric machine 30 is a permanent magnet synchronous motor. In the first embodiment, as the AC rotating electric machine 30, an AC rotating electric machine including a three-phase armature winding wire is used. Accordingly, the inverter 20 includes the three half-bridge circuits. However, the number of phases of the AC rotating electric machine 30 is not limited to three. In other words, it is sufficient that the AC rotating electric machine 30 to be controlled by a control device for an AC rotating electric machine is an AC rotating electric machine including a multi-phase armature winding wire.

The magnetic pole position detection unit 31 detects a position of a magnetic pole in the AC rotating electric machine 30. The magnetic pole position detection unit 31 includes a Hall element or an encoder. The magnetic pole position detection unit 31 detects a rotation angle of the magnetic pole relative to a reference rotation position of a rotor of the AC rotating electric machine 30 and outputs a signal representing a detection value of the detected rotation angle. The detected rotation angle is hereinafter referred to as the "magnetic pole position $\theta$". The magnetic pole position $\theta$ has a value indicative of a rotation angle about a q-axis. The reference rotation position of the rotor is preliminarily set appropriately to a suitable position.

The electric angular speed detection unit 32 detects an electric angular speed $\omega$ of the AC rotating electric machine 30 and outputs a signal representing the detected electric angular speed $\omega$. The electric angular speed detection unit 32 may include a Hall element or an encoder similarly to the magnetic pole position detection unit 31, but may also be configured to arithmetically obtain the electric angular speed $\omega$ through use of the magnetic pole position $\theta$ detected by the magnetic pole position detection unit 31.

The current sensors 33a to 33c detect current quantities iU, iV, and iW of currents flowing in a U-phase, a V-phase, and a W-phase, respectively, in the AC rotating electric machine 30, and output signals representing the detected current quantities iU, iV, and iW, respectively, to a current coordinate converter 47. In FIG. 1, the three current sensors 33a to 33c are provided to detect the U-phase, V-phase, and W-phase current quantities iU, iV, and iW, respectively, but it is not always required to provide the three current sensors 33a to 33c. In other words, it may also be possible to provide two current sensors to detect current quantities in only two phases, and arithmetically determine a current quantity in the other one phase from the detected current quantities in the two phases.

The inverter control unit 40 is connected to each of the gates of the upper-arm switching elements 21a to 21c and the lower-arm switching elements 22a to 22c, which are included in the inverter 20. Thus, the inverter control unit 40 controls the ON/OFF driving of each of the switching elements via a signal supplied to each of the gates of the individual switching elements to adjust respective potentials at connection nodes Uac, Vac, and Wac between the inverter 20 and the AC rotating electric machine 30. By adjusting the respective potentials at the connection nodes Uac, Vac, and Wac, the inverter control unit 40 controls the respective current quantities of the currents flowing in the individual phases in the AC rotating electric machine 30. A more detailed description is given below of a configuration of the inverter control unit 40.

As illustrated in FIG. 1, the inverter control unit 40 includes a current command arithmetic unit 41, a d-axis current adjuster 42, a q-axis current adjuster 43, a voltage coordinate converter 44, a pulse width modulation (PWM) circuit 45, a gate driver 46, and the current coordinate converter 47. The inverter control unit 40 drives the inverter 20 by performing dq vector control to control rotation of the AC rotating electric machine 30. A description is given below of the individual units included in the inverter control unit 40.

An adjusted torque command value Ctrq_adj for specifying a torque to be generated in the AC rotating electric machine 30 is input from the torque command adjustment unit 54 to the current command arithmetic unit 41. A signal representing the DC voltage value Vdc is also input from the voltage detection unit 11 to the current command arithmetic unit 41. The current command arithmetic unit 41 uses the torque command value Ctrq_adj and the DC voltage value Vdc to arithmetically determine a d-axis current command value Cid and a q-axis current command value Ciq and output two signals representing the d-axis current command value Cid and the q-axis current command value Ciq, each of which is arithmetically determined, to subtractors 48 and 49. For descriptive convenience, it is assumed hereinafter that the current command arithmetic unit 41 directly outputs the d-axis current command value Cid and the q-axis current command value Ciq. The same applies also to the other components.

The current coordinate converter 47 converts the three-phase current quantities iU, iV, and iW represented by the signals from the current sensors 33a to 33c to two-phase current quantities, namely, a d-axis current value id and a q-axis current value iq. The current coordinate converter 47 outputs the d-axis current value id and the q-axis current value iq to the subtractors 48 and 49, respectively.

The subtractor 48 subtracts, from the d-axis current command value Cid input thereto, the d-axis current value id input thereto, and outputs, to the d-axis current adjuster 42, a deviation between the d-axis current command value Cid and the d-axis current value id resulting from the subtraction. Likewise, the subtractor 49 subtracts, from the q-axis current command value Ciq input thereto, the q-axis current value iq input thereto, and outputs, to the q-axis current adjuster 43, a deviation between the q-axis current command value Ciq and the q-axis current value iq resulting from the subtraction.

The d-axis current adjuster 42 arithmetically determines a DC d-axis voltage command value Cvd so that the deviation input thereto from the subtractor 48 is 0, and outputs the d-axis voltage command value Cvd to the voltage coordinate converter 44. The q-axis current adjuster 43 arithmetically determines a DC q-axis voltage command value Cvq so that the deviation input thereto from the subtractor 49 is 0, and outputs the q-axis voltage command value Cvq to the voltage coordinate converter 44.

The voltage coordinate converter 44 converts, based on the magnetic pole position $\theta$ received from the magnetic pole position detection unit 31, the two-phase DC d-axis and q-axis voltage command values Cvd and Cvq to three-phase AC voltage command values Cvu, Cvv, and Cvw, and outputs the three-phase AC voltage command values Cvu, Cvv, and Cvw to the PWM circuit 45.

The PWM circuit 45 uses the three-phase AC voltage command values Cvu, Cvv, and Cvw and the DC voltage value Vdc to generate respective control signals for ON/OFF driving of the individual switching elements included in the inverter 20 and output the generated control signals to the gate driver 46.

The gate driver 46 is connected to each of respective gates of the upper-arm switching elements 21a to 21c and the lower-arm switching elements 22a to 22c. The gate driver 46 uses the individual control signals from the PWM circuit 45 to generate signals to be output to the respective gates of the individual switching elements and output the generated signals to the respective gates of the individual switching elements, to thereby control respective switching operations of the individual switching elements. As a result, the inverter 20 is driven by the gate driver 46 to perform DC/AC conversion for converting the DC voltage applied thereto from the DC power source 10 to an AC voltage.

As described above, the inverter control unit 40 receives the torque command value Ctrq_adj input thereto, and drives the inverter 20. Next, a detailed description is given of the torque command value Ctrq_adj input to the inverter control unit 40 and generation thereof.

The temperature detection unit 50 detects a temperature of a protection unit 70. The protection unit 70 is a temperature detection member for directly or indirectly detecting a temperature of an object to be protected from breakdown due to excessive heat. The protection unit 70 is provided so that a temperature thereof varies depending on the temperature of the object to be protected.

For example, the object to be protected is each of the switching elements included in the inverter 20 or the AC rotating electric machine 30. For example, the temperature of the AC rotating electric machine 30 to be detected is a temperature of an armature winding wire or a permanent magnet.

When detection of the temperatures of the switching elements is assumed, the protection unit 70 is provided, for example, on the same substrate on which the switching elements are mounted. The protection unit 70 and the switching elements each provided on the same substrate are in the same environment, and therefore it is conceivable that the temperature of the protection unit 70 increases in proportion to increases in the temperatures of the switching elements. Accordingly, by controlling the detected temperature of protection unit 70 so as not to exceed a set temperature 71 set in advance, it is possible to prevent the switching elements from breaking due to excessive heat. Likewise, when detection of the temperature of the AC rotating electric machine 30 is assumed, it is conceivable to provide the protection unit 70 in a portion thermally connected to the armature winding wire or the permanent magnet.

Thus, it is basically preferred to place the protection unit 70 and the object to be protected in the same environment, that is, in a place where the temperature of the protection unit 70 changes similarly to that of the object to be protected. However, the place where the protection unit 70 is placed is not limited to a place where the temperature of the object to be protected can directly be measured. In other words, the place where the protection unit 70 is placed may also be a place where the temperature of the object to be protected can indirectly be estimated with high accuracy. Consequently, for the switching elements, a junction temperature may also be estimated from the temperature of the protection unit 70. As an estimation algorithm for estimating the junction temperature, a known estimation algorithm can be used. The estimation algorithm may be selected appropriately based on, for example, the place where the protection unit 70 is placed and a type of the object to be protected.

The temperature detection unit 50 includes, for example, a temperature sensor, and directly detects the temperature of the protection unit 70. When the temperature of the protection unit 70 does not directly indicate the temperature to be detected of the object to be protected, the temperature detection unit 50 further includes an estimation unit configured to estimate, from the detected temperature of the protection unit 70, the temperature to be detected of the object to be protected. The detected temperature or the estimated temperature is output as the detected temperature of the object to be protected from the temperature detection unit 50 to the temperature compensation unit 51. To avoid confusion, it is assumed herein that the temperature of the protection unit 70 is the temperature to be detected of the object to be protected. For distinction from another temperature, the detected temperature is hereinafter referred to as the "protection unit temperature". The protection unit temperature corresponds to a detected temperature in the first embodiment.

Figure 2:
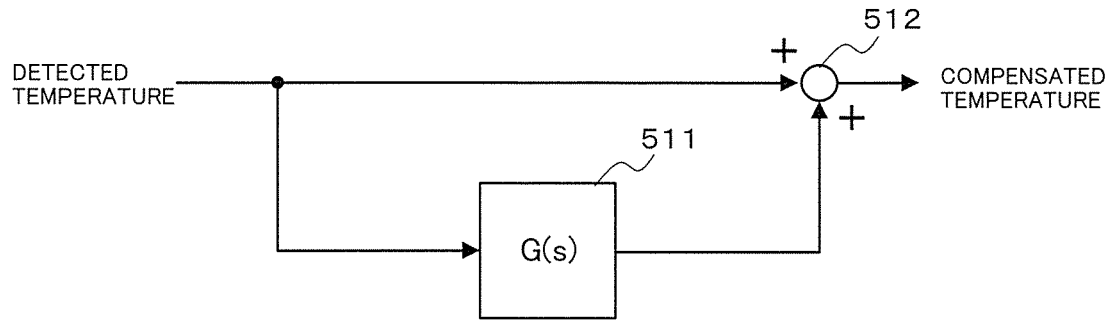
FIG. 2 is a diagram for illustrating an example of a configuration of a temperature compensation unit.

FIG. 2 is a diagram for illustrating an example of a configuration of a temperature compensation unit. The temperature compensation unit 51 uses the protection unit temperature, which is the detected temperature received from the temperature detection unit 50, to calculate a compensated temperature. Accordingly, as illustrated in FIG. 2, the temperature compensation unit 51 includes a compensation amount calculation unit 511 and an adder 512.

The protection unit temperature received from the temperature detection unit 50 is input to each of the compensation amount calculation unit 511 and the adder 512. The compensation amount calculation unit 511 calculates, as a compensation amount, a temperature to be added to the detected temperature, and outputs the calculated compensation amount to the adder 512. As a result, the adder 512 adds the compensation amount to the detected temperature and outputs, as the compensated temperature, a result of the addition. A magnitude relationship between the compensated temperature and the protection unit temperature is given by (protection unit temperature)≤(compensated temperature). The adder 512 corresponds to an addition unit in the first embodiment.

The compensation amount calculation unit 511 includes respective functions of an amplifier, a low-pass filter, and a high-pass filter. A transmission function G(s) for the compensation amount calculation unit 511 to calculate the compensation amount is given by Expression (1):

$$G(s) = KG_{HPF}(s)G_{LPF}(s) \quad (1)$$

where K is an amplification factor, $G_{LPF}(s)$ is a transmission function serving as the low-pass filter, and $G_{HPF}(S)$ is a transmission function serving as the high-pass filter.

Expression (2) gives a transmission function serving as a primary low-pass filter, while Expression (3) gives a transmission function serving as a primary high-pass filter. Expressions (2) and (3) are given as examples of the transmission functions, and the present invention is not limited thereto.

$$G_{LPF}(s) = \frac{\omega_{LPF}}{s + \omega_{LPF}} \quad (2)$$

$$G_{HPF}(s) = \frac{s}{s + \omega_{HPF}} \quad (3)$$

In Expressions (2) and (3), s is a Laplace operator, $\omega_{LPF}$ is a cutoff frequency serving as the low-pass filter, and $\omega_{HPF}$ is a cutoff frequency serving as the high-pass filter.

Figure 3:
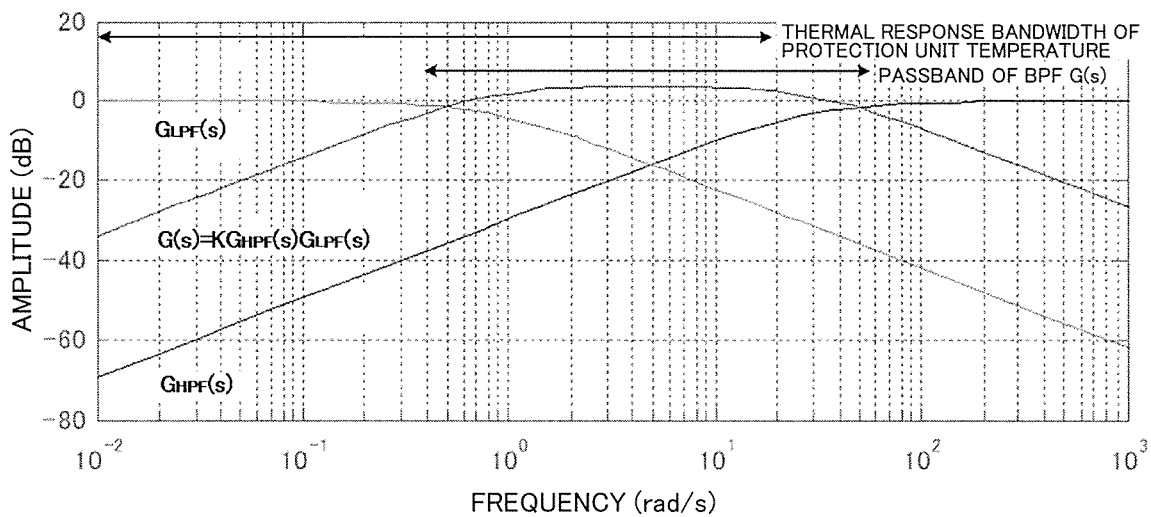
FIG. 3 is a graph for showing an example of a frequency characteristic of a transmission function G(s) adopted for a compensation amount calculation unit.

FIG. 3 is a graph for showing an example of a frequency characteristic of the transmission function G(s) adopted for the compensation amount calculation unit. FIG. 3 shows an example of a case in which the cutoff frequency $\omega_{LPF}$ of the low-pass filter is set to a value smaller than that of the cutoff frequency $\omega_{HPF}$ of the high-pass filter and the amplification factor is set to a positive value. Accordingly, the transmission function G(s) has a characteristic of a bandpass filter. In other words, as shown in FIG. 3, a passband of the transmission function G(s) corresponds to a range higher than the cutoff frequency $\omega_{LPF}$ and lower than the cutoff frequency $\Omega_{HPF}$. The passband is required to include a thermal response bandwidth of the protection unit 70.

The compensation amount calculated by the compensation amount calculation unit 511 becomes larger as an amount of change of the protection unit temperature serving as the detected temperature of the protection unit 70 becomes larger. Accordingly, the compensated temperature has a value equal to or larger than that of the protection unit temperature. As a result, a quantity of a current supplied to each of the switching elements and the AC rotating electric machine 30 is further reduced to allow more reliable prevention of breakdown of each of the switching elements and the AC rotating electric machine 30 due to excessive heat, details of which are described later.

Figure 4:
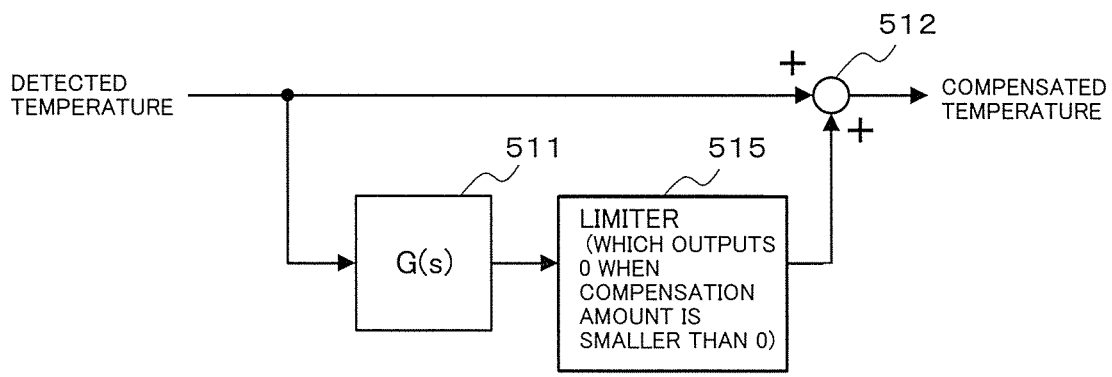
FIG. 4 is a diagram for illustrating a modification example of the temperature compensation unit.

Note that, a configuration of the temperature compensation unit 51 is not limited to that as illustrated in FIG. 2. For example, as illustrated in FIG. 4, it may also be possible to arrange a limiter 515 in a stage subsequent to that of the compensation amount calculation unit 511 and limit a range of the compensation amount output from the compensation amount calculation unit 511 through use of the limiter 515. As the limiter 515, a limiter configured to adjust the compensation amount smaller than 0 to 0 is conceivable. When such a limiter 515 is arranged, it is possible to reliably prevent the compensated temperature from becoming less than the detected temperature. This limiter corresponds to a compensation amount limiting unit in the first embodiment.

The maximum current adjustment unit 52 adjusts a value of a maximum current quantity Imax so that the compensated temperature calculated by the temperature compensation unit 51 does not exceed the set temperature 71 set in advance. The maximum current adjustment unit 52 outputs, as a maximum current quantity Imax_adj, the adjusted maximum current amount Imax to the allowable torque calculation unit 53. For example, the set temperature 71 is data stored in a storage device, for example, a register.

The allowable torque calculation unit 53 uses the maximum current quantity Imax_adj output from the maximum current adjustment unit 52, the electric angular speed ω received from the electric angular speed detection unit 32, and the DC voltage Vdc output from the voltage detection unit 11 to calculate an allowable torque Ctrq_alw. The calculated allowable torque Ctrq_alw is output to the torque command adjustment unit 54.

The torque command adjustment unit 54 adjusts a torque command value Ctrq for the AC rotating electric machine 30 input thereto so that the torque command value Ctrq is within a range of the allowable torque Ctrq_alw output from the allowable torque calculation unit 53. To indicate the range, the allowable torque Ctrq_alw has an upper limit value Ctrq_alw_upper and a lower limit value Ctrq_alw_lower. Accordingly, the allowable torque Ctrq_alw is used herein as a collective term for parameters including the upper limit value Ctrq_alw_upper and the lower limit value Ctrq_alw_lower. The adjusted torque command value Ctrq is output as the torque command value Ctrq_adj from the torque command adjustment unit 54 to the current command arithmetic unit 41.

A more detailed description is given herein of the maximum current quantity Imax_adj output from the maximum current adjustment unit 52. The maximum current quantity Imax_adj is a maximum value allowed at the present time for a phase current absolute value given by Expression (4).

$$\text{(phase current absolute value)} = \sqrt{(d-\text{axis current value } id)^2 + (q-\text{axis current value } iq)^2} \quad (4)$$

For example, when the adjusted maximum current quantity Imax_adj output from the maximum current adjustment unit 52 is 500 A, the allowable torque calculation unit 53 calculates a maximum toque that can be generated from the AC rotating electric machine 30 under a condition under which the phase current absolute value is equal to or smaller than 500 A. Accordingly, when the torque command value Ctrq_adj within a range of the allowable torque is input, the d-axis current command value Cid and the q-axis current command value Ciq, which are output from the current command arithmetic unit 41, basically satisfy a condition given by Expression (5).

$$\sqrt{(d-\text{axis current command value } Cid)^2 + (q-\text{axis current command value } Ciq)^2} \leq 500(A) \quad (5)$$

The d-axis current value id and the q-axis current value iq are feedback-controlled to the d-axis current command value Cid and the q-axis current command value Ciq, respectively. Accordingly, by controlling each of absolute values of the d-axis current command value Cid and the q-axis current command value Ciq to a value equal to or smaller than the maximum current quantity Imax_adj, it is also possible to control the phase current absolute value to a value equal to or smaller than the maximum current quantity Imax_adj.

Figure 5:
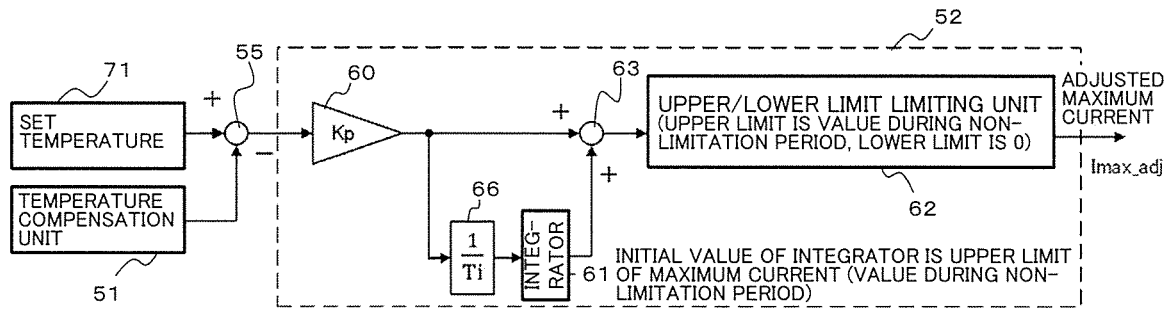
FIG. 5 is a diagram for illustrating an example of a configuration of a maximum current adjustment unit.

FIG. 5 is a diagram for illustrating an example of a configuration of a maximum current adjustment unit. Referring to FIG. 5, a more specific description is given of the maximum current adjustment unit 52.

As illustrated in FIG. 5, the maximum current adjustment unit 52 includes a proportional adjuster 60, a multiplier 66, an integrator 61, an upper/lower limit limiting unit 62, and an adder 63. A deviation output from the subtractor 55, that is, a value obtained by subtracting, from the set temperature 71, the compensated temperature output from the temperature compensation unit 51 is input to the proportional adjuster 60. The deviation has a negative value when a magnitude relationship given by (set temperature 71)<(compensated temperature) is satisfied. Accordingly, when the magnitude relationship is satisfied, as the compensated temperature becomes higher, the deviation has a smaller value.

The proportional adjuster 60 multiplies the deviation input thereto by a proportional gain Kp and outputs a result of the multiplication to each of the multiplier 66 and the adder 63. The proportional gain Kp is a positive constant.

The multiplier 66 multiplies, by a set coefficient, the multiplication result output from the proportional adjuster 60. A result of the multiplication is output from the multiplier 66 to the integrator 61. Note that, "Ti" illustrated in FIG. 5 represents an integration period.

The integrator 61 integrates the multiplication result input thereto from the multiplier 66. When the multiplication result is input from the multiplier 66 to the integrator 61, the integrator 61 adds the multiplication result to a current value of integral. To the integrator 61, for example, an upper limit value of the maximum current quantity Imax is set as an initial value. The upper limit value is a value during a non-limitation period, that is, a design upper limit value of the "phase current absolute value" given by Expression (4). The design upper limit value is a value mainly determined by a loss occurring in the switching elements and by cooling performance, which is basically a constant. Therefore, under any condition, a current larger than the design upper limit value is normally prevented from flowing in the switching elements. Meanwhile, the maximum current quantity Imax_adj is the adjusted value that varies. The maximum current quantity Imax_adj has a value between 0 and the design upper limit value of the phase current absolute value.

In the example of the configuration illustrated in FIG. 5, the maximum current quantity Imax_adj is adjusted by the feedback control. Accordingly, after activation, a given period of time is required before a current having an appropriate value is supplied to the AC rotating electric machine 30. Consequently, when the initial value of the integrator 61 is set to, for example, 0, even though the detected temperature received from the temperature detection unit 50 is low and no protection is required, the maximum current quantity Imax_adj immediately after the activation has a small value, and therefore a sufficient torque cannot be generated in the AC rotating electric machine 30. This presents a problem when, for example, an engine is started through use of the AC rotating electric machine 30. Meanwhile, when the initial value of the integrator 61 is set to the upper limit value of the maximum current quantity Imax, after the activation of the inverter 20, it is possible to reliably generate the required torque in the AC rotation electric machine 30. During the activation of the inverter 20, even when the inverter 20 is activated under a state in which the detected temperature received from the temperature detection unit 50 is over the set temperature 71, it is also possible to reliably protect the switching elements and the AC rotating electric machine. The initial value of the integrator 61 is set to the upper limit value of the maximum current quantity Imax to allow such an advantage to be obtained.

In the example of the configuration illustrated in FIG. 5, when the compensated temperature received from the temperature compensation unit 51 is higher than the set temperature 71, the deviation output from the subtractor 55 has a negative value, and the multiplication result output from the proportional adjuster 60 also has a negative value. Accordingly, a result of the integration output from the integrator 61 is smaller. Meanwhile, when the compensated temperature received from the temperature compensation unit 51 is less than the set temperature 71, the deviation output from the subtractor 55 has a positive value, and the multiplication result output from the proportional adjuster 60 also has a positive value. Accordingly, the integration result output from the integrator 61 is larger. The integration result is output to the adder 63. As a result, the adder 63 adds up the integration result and the multiplication result output from the proportional adjustor 60 and outputs a result of the addition to the upper/lower limit limiting unit 62.

As described above, the multiplication result output from the proportional adjuster 60 and the integration result output from the integrator 61 vary depending on the deviation input from the subtractor 55. The addition result output from the adder 63 may be larger than the upper limit value of the maximum current quantity Imax. The addition result may also be smaller than 0. Accordingly, the upper/lower limit limiting unit 62 limits a range of the addition result output from the adder 63. For this purpose, as an upper limit value of the upper/lower limit limiting unit 62, for example, the upper limit value of the maximum current quantity Imax is set, while, as a lower limit value of the upper/lower limit limiting unit 62, for example, 0 is set. Consequently, the upper/lower limit limiting unit 62 determines, for example, the addition result larger than the upper limit value to be the upper limit value and determines, for example, the addition result smaller than the lower limit value to be the lower limit value. The other addition results are kept unchanged. Each of the addition results thus limited is output as the maximum current quantity Imax_adj from the upper/lower limit limiting unit 62 to the allowable torque calculation unit 53. Thus, the maximum current adjustment unit 52 causes the proportional adjuster 60, the multiplier 66, and the integrator 61 to perform proportional/integral compensation on the deviation output from the subtractor 55, and outputs the maximum current quantity Imax_adj as a result of the proportional/integral compensation.

The maximum current adjustment unit 52 is not limited to the configuration illustrated in FIG. 5. Referring to FIG. 6 to FIG. 10, a specific description is given of modification examples of a configuration of the maximum current adjustment unit 52. In FIG. 6 to FIG. 10, the same components or basically the same components as those illustrated in FIG. 5 are given the same reference numerals. Accordingly, the modification examples are described with focus on different portions.

Figure 6:
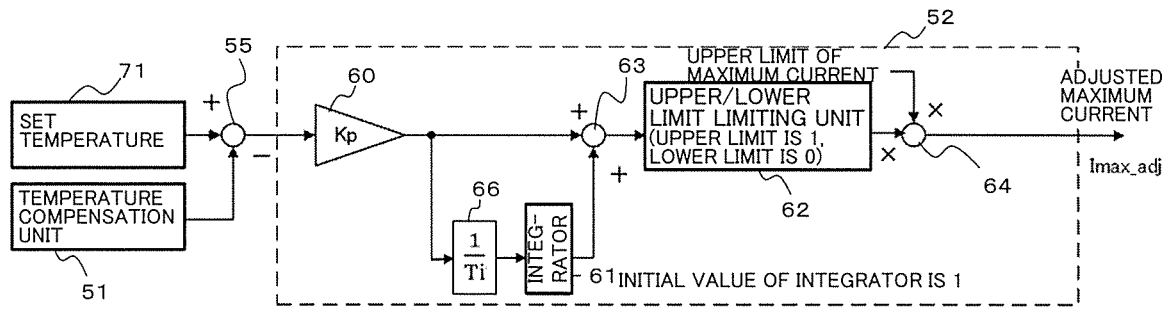
FIG. 6 is a diagram for illustrating a first modification example of the maximum current adjustment unit.

FIG. 6 is a diagram for illustrating the first modification example of the maximum current adjustment unit. As illustrated in FIG. 6, the maximum current adjustment unit 52 of the first modification example further includes a multiplier 64. The multiplier 64 multiplies the upper limit value of the maximum current quantity Imax by a value output from the upper/lower limit limiting unit 62. A result of the multiplication is output as the maximum current quantity Imax_adj from the maximum current adjustment unit 52.

In the first modification example, unlike in the example of the configuration illustrated in FIG. 5, the upper/lower limit limiting unit 62 limits the addition result input thereto from the adder 63 to, for example, a range from 0 to 1. This is because a value output therefrom is multiplied by the maximum current quantity Imax_adj by the multiplier 64. Limiting of the output value to the range from 0 to 1 may be performed appropriately by, for example, dividing the input addition result by the upper limit value of the maximum current quantity Imax to set 1 when a result of the division is larger than 1 and set 0 when the division result is smaller than 0. The maximum current adjustment unit 52 thus includes the upper/lower limit limiting unit 62 and the multiplier 64, and therefore the initial value to be set to the integrator 61 may be set appropriately to 1.

Even such a configuration allows the maximum current adjustment unit 52 to output the same maximum current quantity Imax_adj as that output in the example of the configuration illustrated in FIG. 5. The maximum current quantity Imax_adj does not exceed the upper limit value of the maximum current quantity Imax or have a negative value.

Figure 7:
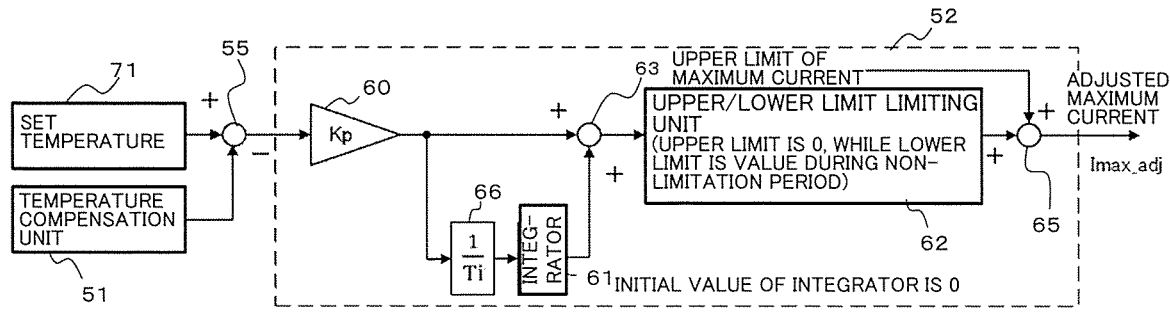
FIG. 7 is a diagram for illustrating a second modification example of the maximum current adjustment unit.

FIG. 7 is a diagram for illustrating the second modification example of the maximum current adjustment unit. As illustrated in FIG. 7, the maximum current adjustment unit 52 of the second modification example further includes an adder 65. The adder 65 adds, to the upper limit value of the maximum current quantity Imax, a value output from the upper/lower limit limiting unit 62. A result of the addition is output as the maximum current quantity Imax_adj from the maximum current adjustment unit 52.

In the second modification example, unlike in the first modification example described above, the upper/lower limit limiting unit 62 limits the addition result input thereto from the adder 63 to a range in which, for example, 0 is an upper limit value. This is because the value output therefrom is added to the maximum current quantity Imax_adj by the adder 65. Limiting of the output value to the range in which 0 is the upper limit value may be performed appropriately by, for example, multiplying the input addition result by −1 to set 0 when a result of the multiplication is larger than 0 and keep the multiplication result unchanged when the multiplication result is smaller than 0. The maximum current adjustment unit 52 thus includes the upper/lower limit limiting unit 62 and the adder 65, and therefore the initial value to be set to the integrator 61 may be set appropriately to 0.

Even such a configuration allows the maximum current adjustment unit 52 to output the same maximum current quantity Imax_adj as that output in the example of the configuration illustrated in FIG. 5 and the first modification example illustrated in FIG. 6. The maximum current quantity Imax_adj does not exceed the upper limit value of the maximum current quantity Imax or have a negative value.

Figure 8:
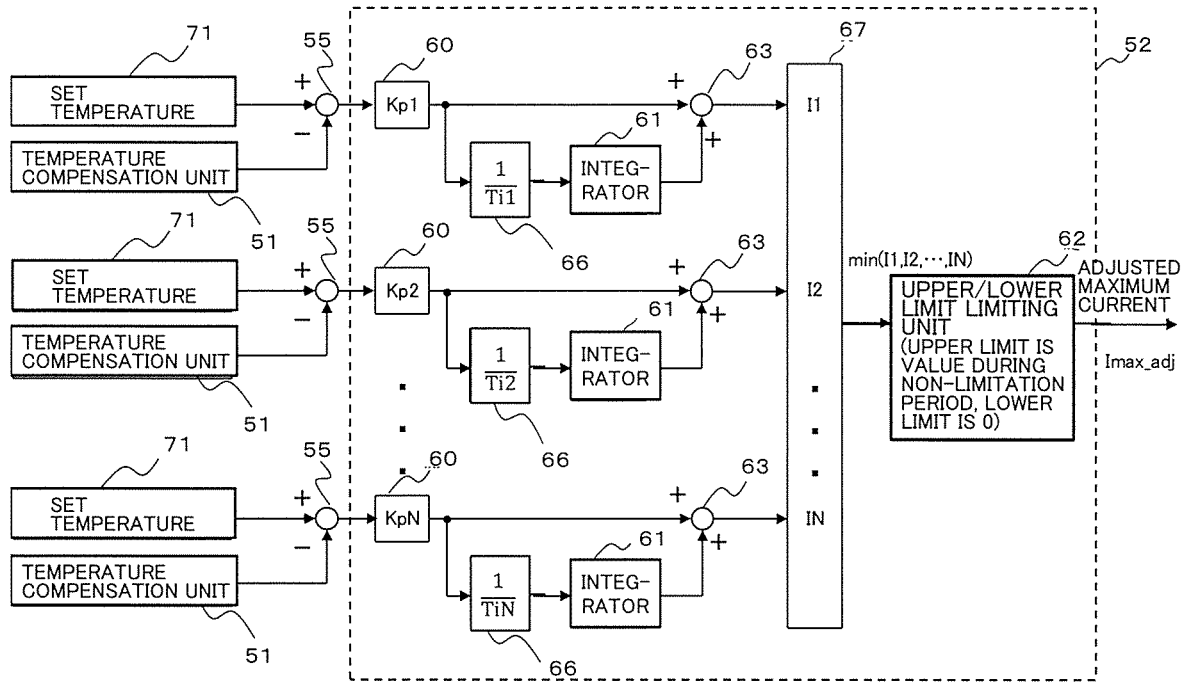
FIG. 8 is a diagram for illustrating a third modification example of the maximum current adjustment unit.

FIG. 8 is a diagram for illustrating the third modification example of the maximum current adjustment unit. In the example of the configuration illustrated in FIG. 1, only one protection unit 70 is illustrated. However, a plurality of protection units 70 may also be provided. In a third example of the configuration, it is assumed that a plurality of protection units 70 are provided. As illustrated in FIG. 8, in the third modification example, the proportional adjuster 60, the multiplier 66, the integrator 61, and the adder 63 are provided for each of the protection units 70. Accordingly, the temperature compensation unit 51 and the adder 55 are also provided for each of the protection units 70.

Each of the multipliers 66 multiplies, by the set coefficient, the multiplication result output from the corresponding proportional adjuster 60. The corresponding integrator 61 integrates the multiplication result output from the multiplier 66. The corresponding adder 63 adds, to the multiplication result output from the proportional adjuster 60, the integration result output from the integrator 61. A result of the addition is output from the adder 63 to a selection unit 67.

The selection unit 67 receives the respective addition results input thereto from the individual adders 63, selects the minimum addition result from among the addition results input thereto, and outputs the selected addition result to the upper/lower limit limiting unit 62. The reason for causing the selection unit 67 to select the minimum addition result is that the object to be protected for which the minimum addition result is obtained is in a most dangerous state, that is, at a highest temperature.

The upper/lower limit limiting unit 62 has the same function as that in FIG. 5, and limits the addition result input thereto to the range between the set upper limit value and the set lower limit value. The addition result limited by the upper/lower limit limiting unit 62 serves as the maximum current quantity Imax_adj.

When only one protection unit 70 is provided, the protection unit 70 may be provided appropriately in the object to be protected that is at a highest temperature among all the objects to be protected. By providing the protection unit 70 in such an object to be protected, it is possible to protect all the objects to be protected. However, for some reason, the object to be protected in which the protection unit 70 is not provided may be at a highest temperature. Even when such a possibility is conceivable, by providing the respective protection units 70 in the individual objects to be protected or in the plurality of objects to be protected which may possibly be at a highest temperature, in the third modification example, it is possible to output the maximum current quantity Imax_adj that is preferred for the object to be protected in a worst state. As a result, in the third modification example, all the objects to be protected can more reliably be protected than those in each of the examples of the configuration illustrated in FIG. 5 to FIG. 7, and higher safety can be achieved than in each of the examples of the configuration illustrated in FIG. 5 to FIG. 7.

Figure 9:
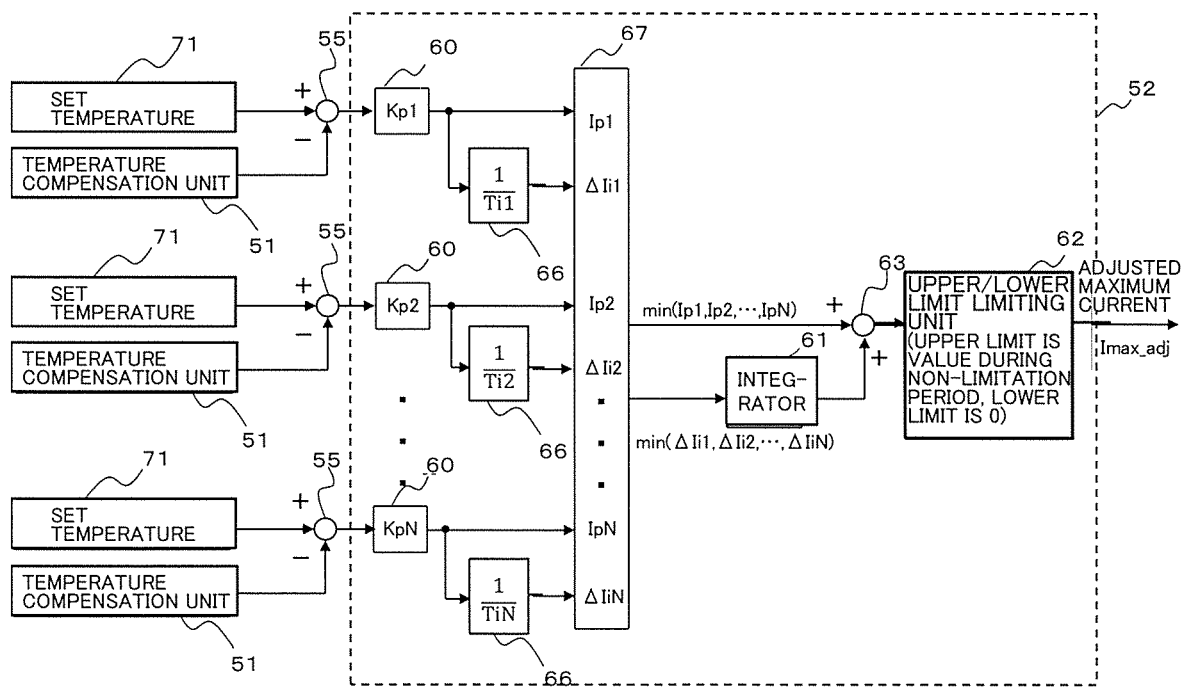
FIG. 9 is a diagram for illustrating a fourth modification example of the maximum current adjustment unit.

FIG. 9 is a diagram for illustrating the fourth modification example of the maximum current adjustment unit. In the example of the fourth modification example, in the same manner as in the third modification example, it is also assumed that a plurality of protection units 70 are provided. As illustrated in FIG. 9, in the fourth modification example, the proportional adjuster 60 and the multiplier 66 are provided for each of the protection units 70. Both of the multiplication result output from each of the proportional adjusters 60 and the multiplication result output from each of the multipliers 66 are output to the selection unit 67.

The selection unit 67 selects the one of the multiplication results input thereto from the individual proportional adjusters 60 that has the minimum value and the one of the multiplication results input thereto from the individual multipliers 66 that has the minimum value, and outputs the selected multiplication results having the minimum values. This is because, in the same manner as in the third modification example, in protecting the objects to be protected, the minimum values correspond to worst values. The multiplication result selected from among the multiplication results input from the individual proportional adjusters 60 is output to the adder 63, while the multiplication result selected from among the multiplication results input from the individual multipliers 66 is output to the integrator 61.

The integrator 61 integrates the multiplication result input thereto from the selection unit 67, and outputs a result of the integration to the adder 63. The adder 63 adds, to a result of the multiplication input thereto from the selection unit 67, the integration result input thereto from the integrator 61, and outputs a result of the addition to the upper/lower limit limiting unit 62. The upper/lower limit limiting unit 62 limits the addition result input thereto to the range between the set upper limit value and the set lower limit value in the same manner as in the third modification example. The addition result limited by the upper/lower limit limiting unit 62 serves as the maximum current quantity Imax_adj.

Thus, in the fourth modification example, the addition result output from the adder 63, that is, the maximum current quantity Imax before being limited is obtained through use of the worst value among the respective values of the multiplication results output from the individual proportional adjusters 60 and the worst value among the respective values of the multiplication results output from the individual multipliers 66. Accordingly, in the fourth modification example, all the objects to be protected can more reliably be protected than those in the third modification example, and higher safety is achieved than in the third modification example.

Figure 10:
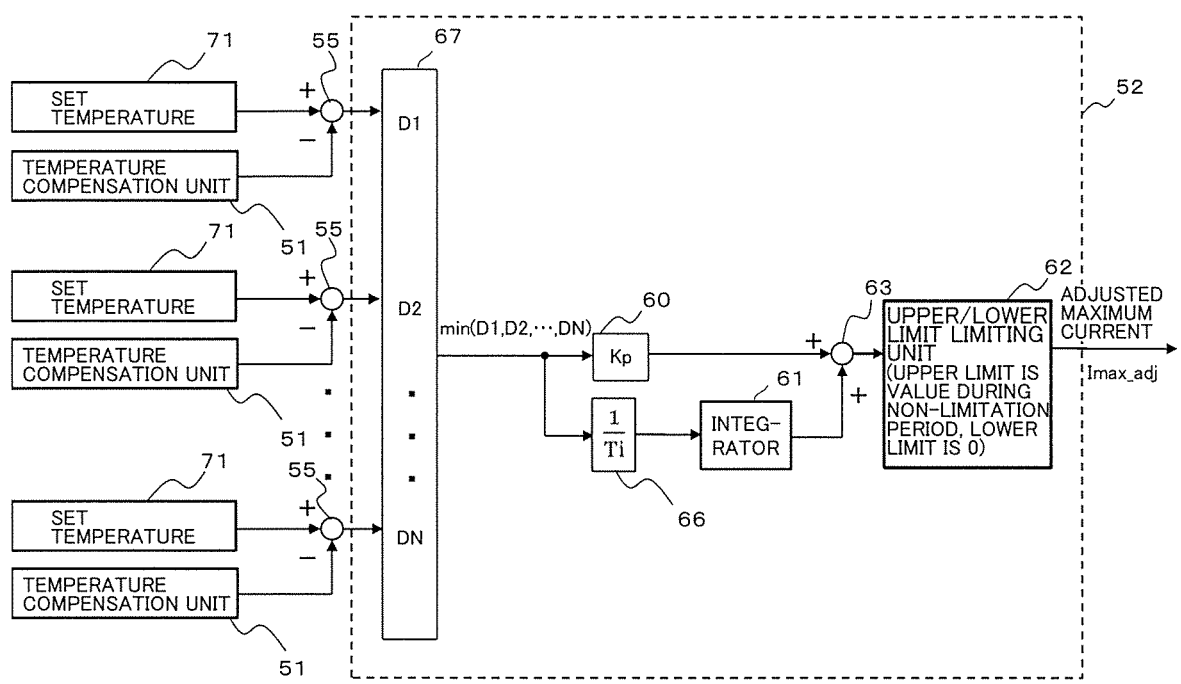
FIG. 10 is a diagram for illustrating a fifth modification example of the maximum current adjustment unit.

FIG. 10 is a diagram for illustrating the fifth modification example of the maximum current adjustment unit. In the example of the fifth modification example, in the same manner as in the third and fourth modification examples, it is also assumed that a plurality of protection units 70 are provided. As illustrated in FIG. 10, in the fifth modification example, the subtraction results output as deviations from the individual subtractors 55 are input to the selection unit 67. Consequently, the selection unit 67 selects the one of the deviations input thereto that has the minimum value and outputs the selected deviation. The deviation output from the selection unit 67 is input to each of the proportional adjuster 60 and the multiplier 66.

The proportional adjuster 60 multiplies the deviation input thereto by the proportional gain Kp, and outputs a result of the multiplication to the adder 63. The multiplier 66 multiplies the deviation input thereto from the selection unit 67 by the set coefficient. The integrator 61 integrates a result of the multiplication result output from the multiplier 66, and outputs a result of the integration to the adder 63. The adder 63 adds, to the multiplication result from the proportional adjuster 60, the integration result from the integrator 61, and outputs a result of the addition to the upper/lower limit limiting unit 62. The upper/lower limit limiting unit 62 has the same function as that in the fourth modification example.

In the fifth modification example, the same effect as obtained in the third modification example described above is obtained. However, the respective numbers of the required proportional adjusters 60, the required multipliers 66, and the required integrators 61 are favorably smaller than those in the third modification example. Accordingly, when the fifth modification example is implemented by hardware, it is possible to reduce a circuit scale and also further reduce production cost. When the fifth modification example is implemented by software, it is possible to further simplify details of control and also further reduce development cost.

Referring back to FIG. 1, the allowable torque calculation unit 53 uses each of the maximum current quantity Imax_adj output from the maximum current adjustment unit 52 and the DC voltage Vdc output from the voltage detection unit 11 to calculate the allowable torque Ctrq_alw, as described above. For example, calculation of the allowable torque Ctrq_alw is performed as follows.

First, the allowable torque calculation unit 53 uses each of the DC voltage Vdc output from the voltage detection unit 11 and a maximum modulation factor MFmax set in advance to arithmetically determine a maximum voltage value Vmax. The maximum voltage value Vmax is a maximum voltage estimated to be applied from the DC power source 10 and is calculated based on, for example, Expression (6):

$$V\text{max} = \text{sqrt}(3/2) \times Vdc \times (1/2) \times MF\text{max} \quad (6).$$

Then, the allowable torque calculation unit 53 uses each of the maximum voltage value Vmax and the electric angular speed ω received from the electric angular speed detection unit 32 to arithmetically determine a maximum interlinkage magnetic flux FLmax. The maximum interlinkage magnetic flux FLmax is a maximum interlinkage magnetic flux generated by the AC rotating electric machine 30 and is calculated based on, for example, Expression (7):

$$FL\text{max} = V\text{max}/\omega \quad (7).$$

Then, the allowable torque calculation unit 53 determines the upper limit value Ctrq_alw_upper and the lower limit value Ctrq_alw_lower of the allowable torque Ctrq_alw based on the maximum interlinkage magnetic flux FLmax and on the maximum current quantity Imax_adj received from the maximum current adjustment unit 52. The upper limit value Ctrq_alw_upper and the lower limit value Ctrq_alw_lower are output from the allowable torque calculation unit 53 to the torque command adjustment unit 54.

In the first embodiment, the upper limit value Ctrq_alw_upper and the lower limit value Ctrq_alw_lower of the allowable torque Ctrq_alw are obtained through use of respective tables. As described above, the upper limit value Ctrq_alw_upper and the lower limit value Ctrq_alw_lower are parameters for limiting a range of the torque command value Ctrq_adj output from the torque command adjustment unit 54.

Figure 11:
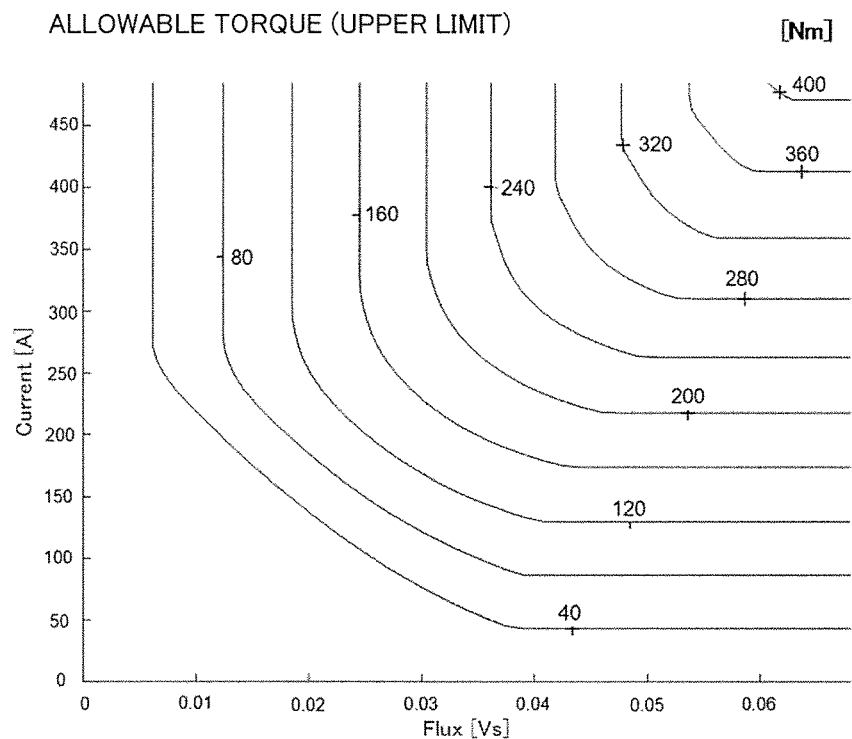
FIG. 11 is a graph for showing an example of details of a table for obtaining an upper limit value Ctrq_alw_upper of an allowable torque Ctrq_alw.
Figure 12:
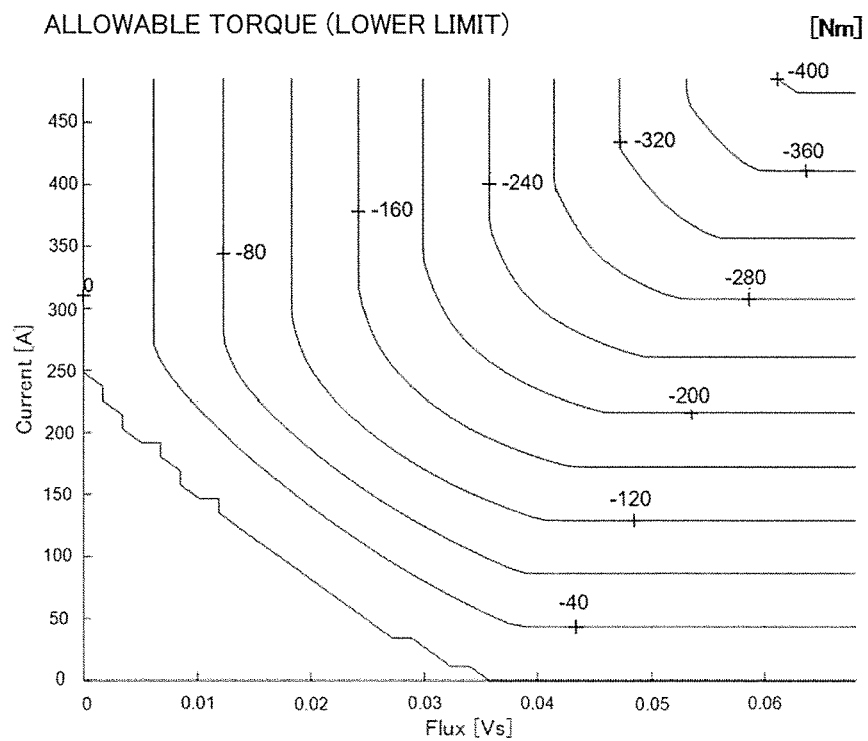
FIG. 12 is a graph for showing an example of details of a table for obtaining a lower limit value Ctrq_alw_lower lower of the allowable torque Ctrq_alw.

Each of the respective tables for determining the upper limit value Ctrq_alw_upper and the lower limit value Ctrq_alw_lower is produced by, for example, a simulation or an experiment in which a current to be supplied to the AC rotating electric machine 30 is varied and an interlinkage magnetic flux and temperatures of the objects to be protected are examined. Referring to FIG. 11 and FIG. 12, a specific description is given of an example of details of these tables. FIG. 11 is a graph for showing an example of the details of the table for obtaining the upper limit value Ctrq_alw_upper of the allowable torque Ctrq_alw. FIG. 12 is a graph for showing an example of the details of the table for obtaining the lower limit value Ctrq_alw_lower of the allowable torque Ctrq_alw.

In each of FIG. 11 and FIG. 12, an ordinate axis represents a current quantity, while an abscissa axis represents the interlinkage magnetic flux denoted by Flux. A plurality of curves illustrated in the graph represent, for the individual allowable torques that can be allowed, changes caused in the current quantity by the interlinkage magnetic flux. Thus, each of the tables is a two-dimensional table using the current quantity and the interlinkage magnetic flux to represent the allowable torque. Accordingly, the allowable torque calculation unit 53 refers to each of the tables through use of the maximum interlinkage magnetic flux FLmax and the maximum current quantity Imax_adj to obtain the upper limit value Ctrq_alw_upper and the lower limit value Ctrq_alw_lower. Each of, for example, "40", "80", and "120" shown in FIG. 11 indicates the allowable torque value. Likewise, each of, for example, "−40", "−80", and "−120" shown in FIG. 12 indicates the allowable torque value.

FIG. 11 and FIG. 12 show that the toque varies depending on the current quantity and on the interlinkage magnetic flux. As described above, the maximum interlinkage magnetic flux FLmax varies depending on the maximum voltage value Vmax and on the electric angular speed ω. Accordingly, by receiving the maximum current quantity Imax_adj input from the maximum current adjustment unit 52, calculating the maximum voltage value Vmax, and further calculating the maximum interlinkage magnetic flux FLmax from the calculated maximum voltage value Vmax, it is possible to obtain the upper limit value Ctrq_alw_upper and the lower limit value Ctrq_alw_lower.

The torque command adjustment unit 54 compares the torque command value Ctrq input thereto to each of the upper limit value Ctrq_alw_upper and the lower limit value Ctrq_alw_lower that are input thereto from the allowable torque calculation unit 53, and controls the torque command value Ctrq based on results of the comparisons. As a result, when the torque command value Ctrq is larger than the upper limit value Ctrq_alw_upper, that is, when a magnitude relationship given by (torque command value Ctrq)>(upper limit value Ctrq_alw_upper) is satisfied, the torque command adjustment unit 54 performs a manipulation operation of determining the upper limit value Ctrq_alw_upper to be the torque command value Ctrq, that is, a manipulation operation of satisfying (torque command value Ctrq)=(upper limit value Ctrq_alw_upper). The torque command value Ctrq after the manipulation operation is output as the torque command value Ctrq_adj from the torque command adjustment unit 54.

When the torque command value Ctrq is smaller than the lower limit value Ctrq_alw_lower, that is, when a magnitude relationship given by (torque command value Ctrq)<(lower limit value Ctrq_alw_lower) is satisfied, the torque command adjustment unit 54 performs a manipulation operation of determining the lower limit value Ctrq_alw_lower to be the torque command value Ctrq, that is, a manipulation operation of satisfying (torque command value Ctrq)=(lower limit value Ctrq_alw_lower). The torque command value Ctrq after the manipulation operation is output as the torque command value Ctrq_adj from the torque command adjustment unit 54. When the torque command value Ctrq is within a range equal to or higher than the lower limit value Ctrq_alw_lower and equal to or lower than the upper limit value Ctrq_alw_upper, that is, a magnitude relationship given by (lower limit value Ctrq_alw_lower)(torque command value Ctrq)≤(upper limit value Ctrq_alw_upper) is satisfied, the torque command adjustment unit 54 directly outputs the torque command value Ctrq as the torque command value Ctrq_adj.

Accordingly, the torque command value Ctrq_adj output from the torque command adjustment unit 54 is as follows.

(1) When (torque command value Ctrq)>(upper limit value Ctrq_alw_upper) is satisfied, (torque command value Ctrq_adj)=(upper limit value Ctrq_alw_upper) is satisfied.

(2) When (lower limit value Ctrq_alw_lower)≤(torque command value Ctrq)≤(upper limit value Ctrq_alw_upper) is satisfied, (torque command value Ctrq_adj)=(torque command value Ctrq) is satisfied.

(3) When (torque command value Ctrq)<(lower limit value Ctrq_alw_lower) is satisfied, (torque command value Ctrq_adj)=(lower limit value Ctrq_alw_lower) is satisfied.

Thus, in the first embodiment, the torque command value Ctrq_adj is limited to the range given by (lower limit value Ctrq_alw_lower)≤(torque command value Ctrq_adj)≤(lower limit value Ctrq_alw_upper) to drive the AC rotating electric machine 30. Next, referring to FIG. 13 to FIG. 16, a specific description is given of protection of the objects to be protected from excessive heat that is allowed by thus limiting the torque command value Ctrq_adj.

Figure 13:
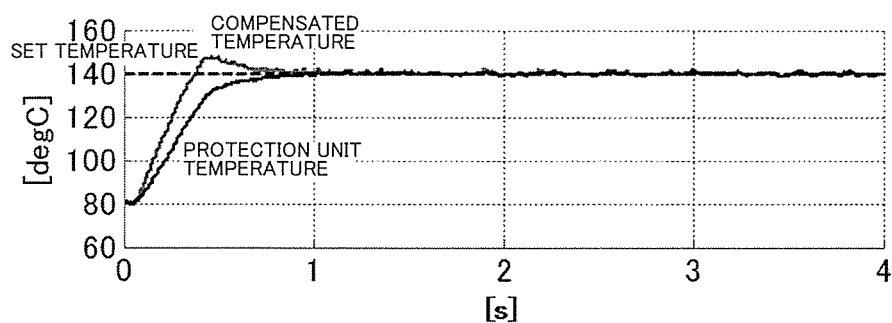
FIG. 13 is a graph for showing an example of a variation with time of a temperature of each of objects to be protected when the control device for the AC rotating electric machine according to the first embodiment of the present invention is caused to control the AC rotating electric machine.
Figure 14:
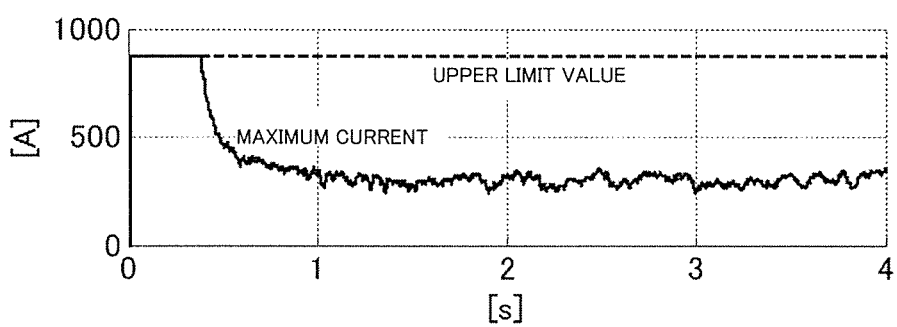
FIG. 14 is a graph for showing an example of a variation with time of a maximum quantity of a current flowing in the object to be protected when the control device for the AC rotating electric machine according to the first embodiment of the present invention is caused to control the AC rotating electric machine.
Figure 15:
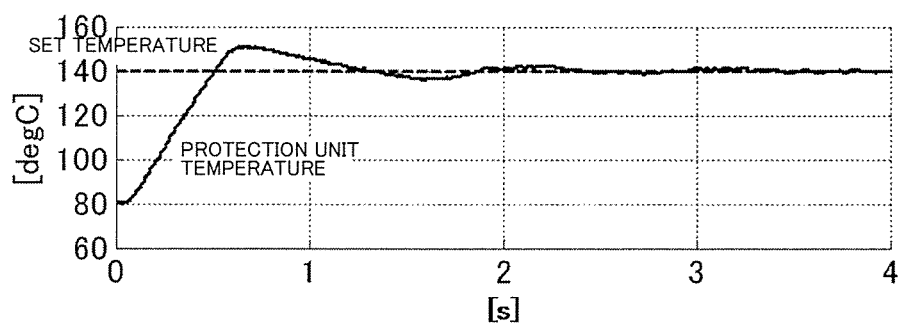
FIG. 15 is a graph for showing an example of a variation with time of a temperature of the object to be protected when a related-art control device for an AC rotating electric machine is caused to control the AC rotating electric machine.
Figure 16:
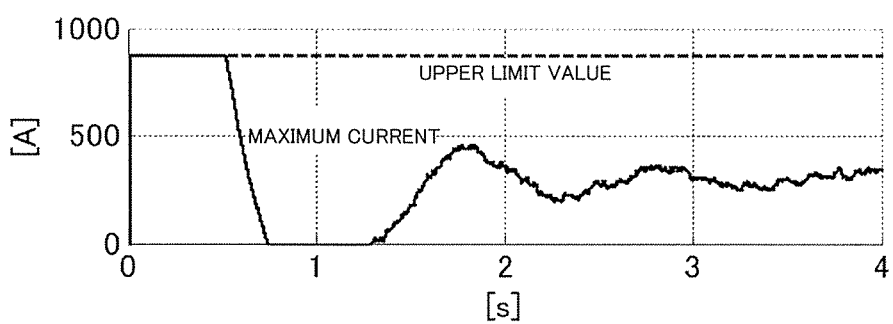
FIG. 16 is a graph for showing an example of a variation with time of a maximum quantity of a current flowing in the object to be protected when the related-art control device for the AC rotating electric machine is caused to control the AC rotating electric machine.

FIG. 13 is a graph for showing an example of a variation with time of a temperature of each of the objects to be protected when the control device for the AC rotating electric machine according to the first embodiment of the present invention is caused to control the AC rotating electric machine. FIG. 14 is a graph for showing an example of a variation with time of a maximum quantity of a current flowing in the object to be protected when the control device for the AC rotating electric machine according to the first embodiment of the present invention is caused to control the AC rotating electric machine. FIG. 15 is a graph for showing an example of a variation with time of the temperature of the object to be protected when a related-art control device for an AC rotating electric machine is caused to control the AC rotating electric machine. FIG. 16 is a graph for showing an example of a variation with time of a maximum quantity of a current flowing in the object to be protected when the related-art control device for the AC rotating electric machine is caused to control the AC rotating electric machine. In each of FIG. 13 and FIG. 15, an ordinate axis represents a temperature, while an abscissa axis represents a time. In each of FIG. 14 and FIG. 16, an ordinate axis represents a current, while an abscissa axis represents a time.

The respective examples shown in FIG. 13 to FIG. 16 are obtained as results of simulations in which, for portions of the AC rotating electric machines that are not related to the control devices, the same conditions are set. The first embodiment is compared herein to a related-art example, and a specific description is given of an effect achieved by the first embodiment. The related-art example uses a deviation between a temperature detected by the protection unit 70 or a temperature estimated by the protection unit 70 and the set temperature 71 to control the torque command value (see, for example, Japanese Patent No. 6107936). In FIG. 13 and FIG. 15, "PROTECTION UNIT TEMPERATURE" is a collective term for each of the temperature detected by the protection unit 70 and the temperature estimated by the protection unit 70, as described above.

First, referring to FIG. 15 and FIG. 16, a specific description is given of a result of the simulation in the related-art example.

In the simulation, maximum torque control is assumed. Accordingly, immediately after the start of the simulation, the torque of the AC rotating electric machine 30 becomes maximum. In addition, as shown in FIG. 15, an upper-limit-value maximum current flows in each of the switching elements and the AC rotating electric machine 30. As a result, as shown in FIG. 15, the protection unit temperature rapidly increases.

Subsequently, the protection unit temperature reaches the set temperature 71, and consequently the deviation therebetween disappears to satisfy (torque value)=0. As a result, as shown in FIG. 16, the maximum current quantity also rapidly decreases to reach 0. However, a transition time period is required for the maximum current quantity to vary from an upper limit value to 0. As shown in FIG. 15, due to a current flowing during the transition time period, the protection unit temperature further increases to significantly exceed the set temperature 71. Accordingly, in the related-art example, an overshoot corresponding to a temperature by which the protection unit temperature exceeds the set temperature 71 becomes relatively large, and therefore the object to be protected is likely to break down due to excessive heat.

In the example shown in FIG. 15, after the maximum current quantity reaches 0, the protection unit temperature gently decreases. When the protection unit temperature becomes lower than the set temperature 71, the maximum current quantity starts to increase and, subsequently to the starting of the increase thereof, the protection unit temperature starts to increase. After that, when the protection unit temperature reaches the set temperature 71 again, the maximum current quantity decreases, and the protection unit temperature becomes lower than the set temperature 71. Due to a magnitude relationship between the protection unit temperature and the set temperature 71, such an operation is repeated. As a result, the protection unit temperature converges to the set temperature 71.

By contrast, in the first embodiment, as shown in FIG. 13, the compensated temperature equal to or higher than the protection unit temperature is used for control. Accordingly, the compensated temperature reaches the set temperature 71 at a timing earlier than a timing at which the protection unit temperature reaches the set temperature 71 in the related-art example. As shown in FIG. 14, the maximum current quantity also decreases at a timing earlier than that in the related-art example. As a result, as shown in FIG. 13, the protection unit temperature can be reduced to be equal to or lower than the set temperature 71. Even though the protection unit temperature cannot be reduced to be equal to or lower than the set temperature 71, the overshoot or a time period with the overshoot can significantly be reduced compared to that in the related-art example. Accordingly, in the first embodiment, it is possible to reliably prevent the breakdown of the object to be protected due to excessive heat. Even though the breakdown of the object to be protected occurs due to excessive heat, the probability of the occurrence of the breakdown can be reduced to a significantly low level.

Figure 17:
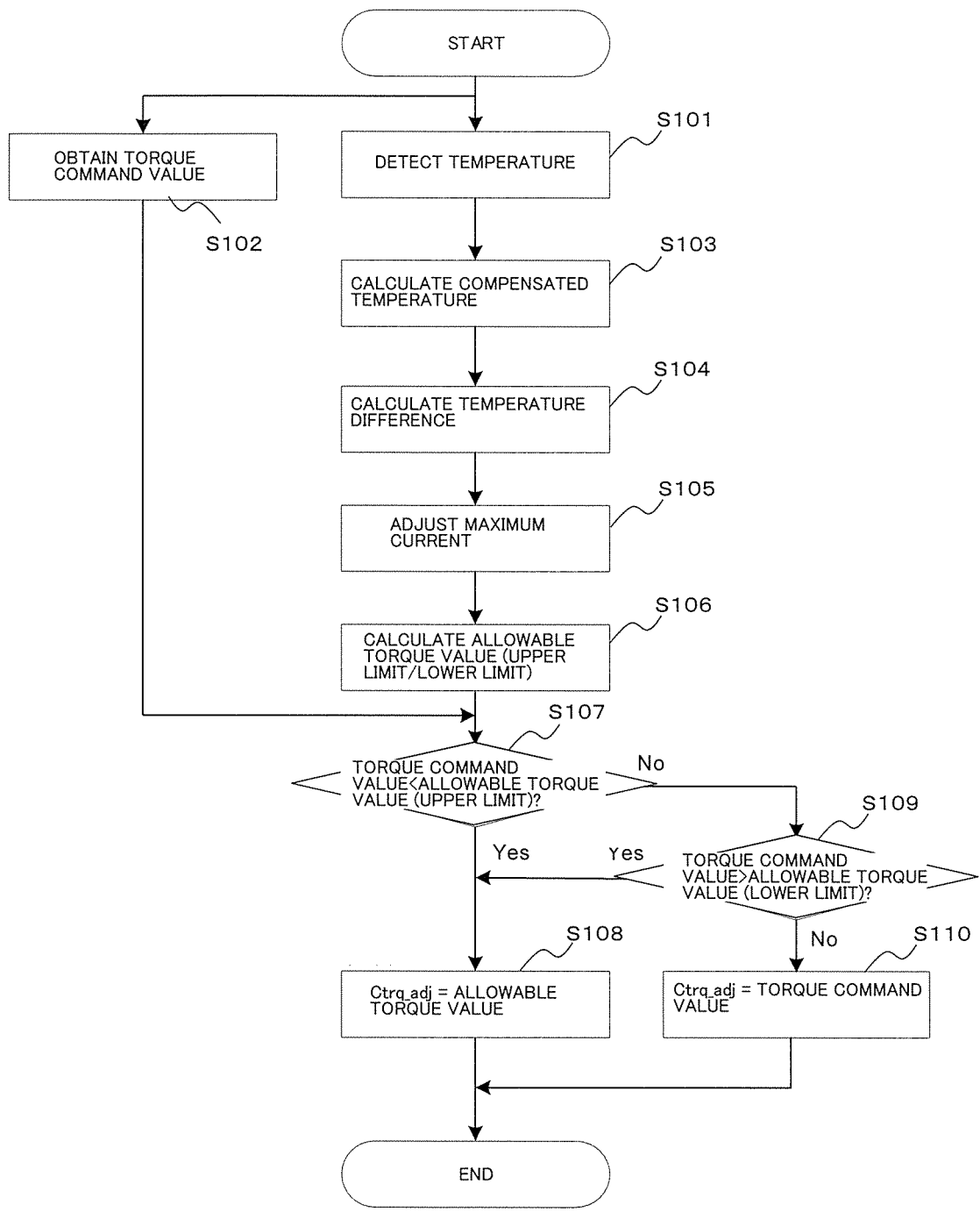
FIG. 17 is a flow chart for illustrating an example of a flow of a sequence of operations of the control device for the AC rotating electric machine according to the first embodiment of the present invention.

FIG. 17 is a flow chart for illustrating an example of a flow of a sequence of operations of the control device for the AC rotating electric machine according to the first embodiment of the present invention. As described above, in the control device, due to the detection of the protection unit temperature by the temperature detection unit 50, the individual units 51 to 54 located in stages subsequent thereto in a data flow perform respective processes. Accordingly, in FIG. 17, an example of the flow of the sequence of operations is illustrated on the assumption that the detection of the protection unit temperature by the temperature detection unit 50 is a starting point. Finally, referring to FIG. 17, a further description is given of the operations of the control device.

For example, the temperature detection unit 50 detects the temperature of the protection unit 70 every time a predetermined time period elapses, and outputs the protection unit temperature to the temperature compensation unit 51 (Step S101). Meanwhile, the torque command adjustment unit 54 obtains, every time the torque command value Ctrq is input thereto, the input torque command value Ctrq (Step S102). Consequently, in the torque command adjustment unit 54, the torque command value Ctrq to be adjusted is constantly present.

In response to the inputting of the protection unit temperature thereto from the temperature detection unit 50, the temperature compensation unit 51 calculates the compensated temperature as described above, and outputs the calculated compensated temperature to the subtractor 55 (Step S103). Consequently, the subtractor 55 subtracts the compensated temperature from the set temperature 71 set as data, and outputs, as a deviation, a difference therebetween as a result of the subtraction to the maximum current adjustment unit 52 (Step S104).

The maximum current adjustment unit 52 calculates the maximum current quantity Imax_adj through use of the deviation input thereto, and outputs the calculated maximum current quantity Imax_adj to the allowable torque calculation unit 53 (Step S105). In response to the inputting of the maximum current quantity Imax_adj thereto, the allowable torque calculation unit 53 obtains the upper limit value Ctrq_alw_upper and the lower limit value Ctrq_alw_lower of the allowable torque Ctrq_alw through use of the maximum current quantity Imax_adj input thereto, and outputs the upper limit value Ctrq_alw_upper and the lower limit value Ctrq_alw_lower to the torque command adjustment unit 54 (Step S106).

The torque command adjustment unit 54 determines whether or not the obtained torque command value Ctrq is larger than the upper limit value Ctrq_alw_upper of the allowable torque Ctrq_alw (Step S107). When the torque command value Ctrq is larger than the upper limit value Ctrq_alw_upper of the allowable torque Ctrq_alw, a result of the determination in Step S107 is "Yes". Accordingly, the torque command adjustment unit 54 determines the upper limit value Ctrq_alw_upper to be the torque command value Ctrq_adj, and outputs the torque command value Ctrq_adj to the current command arithmetic unit 41 (Step S108). By the outputting, the sequence of operations based on an assumption that the detection of the protection unit temperature by the temperature detection unit 50 is the starting point are ended.

Meanwhile, when the torque command value Ctrq is equal to or smaller than the upper limit value Ctrq_alw_upper of the allowable torque Ctrq_alw, a result of the determination is "No". Accordingly, the torque command adjustment unit 54 determines whether or not the torque command value Ctrq is smaller than the lower limit value Ctrq_alw_lower of the allowable torque Ctrq_alw (Step S109). When the torque command value Ctrq is smaller than the lower limit value Ctrq_alw_lower of the allowable torque Ctrq_alw, a result of the determination in Step S109 is "Yes". Accordingly, the torque command adjustment unit 54 determines the lower limit value Ctrq_alw_lower to be the torque command value Ctrq_adj, and outputs the torque command value Ctrq_adj to the current command arithmetic unit 41 (Step S108). By the outputting, the sequence of operations based on the assumption that the detection of the protection unit temperature by the temperature detection unit 50 is the starting point are ended.

When the torque command value Ctrq is equal to or larger than the lower limit value Ctrq_alw_lower of the allowable torque Ctrq_alw, a result of the determination in Step S109 is "No". Accordingly, the torque command adjustment unit 54 determines the torque command value Ctrq to be the torque command value Ctrq_adj, and outputs the torque command value Ctrq_adj to the current command arithmetic unit 41 (Step S110). By the outputting, the sequence of operations based on the assumption that the detection of the protection unit temperature by the temperature detection unit 50 is the starting point are ended.

In the description given above, it is assumed that the temperature detection unit 50, the temperature compensation unit 51, the subtractor 55, the maximum current adjustment unit 52, the allowable torque calculation unit 53, and the torque command adjustment unit 54 are components using different pieces of hardware. However, a portion of the temperature detection unit 50, the temperature compensation unit 51, the subtractor 55, the maximum current adjustment unit 52, the allowable torque calculation unit 53, and the torque command adjustment unit 54 can be implemented in an information processing device. It is sufficient for the information processing device to be a hardware configuration capable of receiving/outputting required information, and the configuration is not particularly limited. Accordingly, the information processing device may also be a processing circuit functioning as the information processing device. The processing circuit may also include a processor configured to execute a program stored in a memory, and may also be dedicated hardware.

When the processing circuit is dedicated hardware, the processing circuit corresponds to, for example, a single circuit, a composite circuit, a programmed processor, a parallel-programmed processor, an application specific integrated circuit (ASIC), a field programmable gate array (FPGA), or a combination thereof. The number of processing circuits is not limited to one, and a plurality of processing circuits may be provided.

Meanwhile, when the processing circuit includes the processor, a portion of the temperature detection unit 50, the temperature compensation unit 51, the subtractor 55, the maximum current adjustment unit 52, the allowable torque calculation unit 53, and the torque command adjustment unit 54 can be implemented by a program to be executed by the processor. To cause the processor to execute the program, the processing circuit includes the memory for storing the program. To implement all or some of the units, it may also be possible to further require firmware.

It can also be said that one or more programs to be executed by the processor are configured to cause the processing circuit to execute a procedure for implementing each of the units described above. As examples of the memory configured to store the programs, volatile memories including a random access memory (RAM) and nonvolatile memories including a read only memory (ROM), a flash memory, an erasable programmable read only memory (EPROM), and an electrically erasable and programmable read only memory (EEPROM) can be listed. As the memory, for example, a magnetic disc, a flexible disc, an optical disc, a compact disc, a mini disc, or a digital versatile disc (DVD) can also be used.

It may also be possible to implement any of respective functions of the individual units described above by dedicated hardware and implement another thereof in the processing circuit. Accordingly, the processing circuit may also implement the individual units described above by hardware, software, firmware, or a combination thereof.

What is claimed is:

1. A control device for an AC rotating electric machine, the control device comprising:
    a temperature detection unit configured to detect a temperature of a protection unit provided in an object to be protected when a current is supplied from a power conversion circuit including a switching element to the AC rotating electric machine and output, as a detected temperature, one of the temperature and a temperature of the object to be protected that is estimated from the temperature;
    a temperature compensation unit configured to calculate, through use of the detected temperature, a compensated temperature equal to or higher than the detected temperature; and
    a torque limiting unit configured to limit, through use of the compensated temperature calculated by the temperature compensation unit, a torque command value input thereto,
    wherein the torque limiting unit includes:
        an arithmetic unit configured to calculate a difference between the compensated temperature calculated by the temperature compensation unit and a set temperature set in advance;
        a maximum current adjustment unit configured to adjust, through use of the difference, a maximum quantity of the current supplied from the power conversion circuit to the AC rotating electric machine so as to prevent the compensated temperature from exceeding the set temperature;
        an allowable torque calculation unit configured to calculate an upper limit value and a lower limit value of the torque command value based on the maximum current quantity adjusted by the maximum current adjustment unit; and
        a torque command adjustment unit configured to adjust the torque command value based on each of the upper limit value and the lower limit value.

2. A control device for an AC rotating electric machine, the control device comprising:
    a temperature detection unit configured to detect a temperature of a protection unit provided in an object to be protected when a current is supplied from a power conversion circuit including a switching element to the AC rotating electric machine and output, as a detected temperature, one of the temperature and a temperature of the object to be protected that is estimated from the temperature;
    a temperature compensation unit configured to calculate, through use of the detected temperature, a compensated temperature equal to or higher than the detected temperature; and
    a torque limiting unit configured to limit, through use of the compensated temperature calculated by the temperature compensation unit, a torque command value input thereto,
    wherein the temperature compensation unit includes:
        a compensation amount calculation unit configured to calculate a compensation amount through use of the detected temperature; and
        an addition unit configured to add the compensation amount to the detected temperature to calculate the compensated temperature.

3. The control device for the AC rotating electric machine according to claim 2,
    wherein the temperature compensation unit further includes:
    a compensation amount limiting unit configured to limit a range of the compensation amount, and
    wherein the addition unit is configured to add, to the detected temperature, the compensation amount limited by the compensation amount limiting unit to calculate the compensated temperature.

4. The control device for the AC rotating electric machine according to claim 2, wherein the compensation amount calculation unit has respective functions of an amplifier, a low-pass filter, and a high-pass filter, and is configured to perform, on the temperature detected by the temperature detection unit, an operation using an amplification factor, a transmission function of the low-pass filter, and a transmission function of the high-pass filter to calculate the compensation amount.

5. The control device for the AC rotating electric machine according to claim 1, further comprising:
    a voltage detection unit configured to detect a DC voltage value of a DC power source; and
    an electric angular speed detection unit configured to detect an electric angular speed of the AC rotating electric machine,
    wherein the allowable torque calculation unit is configured to:
        calculate, based on the DC voltage value detected by the voltage detection unit and on a maximum modulation factor set in advance, a maximum value of a voltage to be applied to the AC rotating electric machine;
        calculate, based on the maximum voltage value and on the electric angular speed, a maximum interlinkage magnetic flux of the AC rotating electric machine; and
        calculate, based on the maximum interlinkage magnetic flux and on the adjusted maximum current quantity, the upper limit value and the lower limit value.

6. The control device for the AC rotating electric machine according to claim 1, wherein the torque command adjustment unit is configured to adjust the torque command value by:

setting, when the torque command value is larger than the upper limit value, the torque command value to the upper limit value, setting, when the torque command value is smaller than the lower limit value, the torque command value to the lower limit value, and maintaining, when the torque command value is in a range equal to or higher than the lower limit value and equal to or lower than the upper limit value, the same torque command value without controlling the torque command value.

7. The control device for the AC rotating electric machine according to claim 1, wherein the temperature compensation unit comprises, when the protection unit comprises a plurality of protection units provided in a plurality of different objects to be protected, a plurality of temperature compensation units provided individually for the plurality of protection units, wherein the arithmetic unit comprises a plurality of arithmetic units;

wherein the torque limiting unit includes the plurality of arithmetic units provided individually for the plurality of temperature compensation units, and wherein the maximum current adjustment unit included in the torque limiting unit is configured to adjust the maximum quantity of the current supplied from the power conversion circuit to the AC rotating electric machine through use of a minimum one of differences individually calculated by the plurality of arithmetic units.

\* \* \* \* \*